(12) United States Patent
Lee et al.

(10) Patent No.: US 8,331,029 B2
(45) Date of Patent: Dec. 11, 2012

(54) OPTICAL SHEET PACKAGE

(75) Inventors: Junghoon Lee, Cheongju (KR); Seungho Lee, Cheongju (KR)

(73) Assignee: LG Electronics Inc., Seoul (KR)

( * ) Notice: Subject to any disclaimer, the term of this patent is extended or adjusted under 35 U.S.C. 154(b) by 478 days.

(21) Appl. No.: 12/738,732

(22) PCT Filed: May 22, 2008

(86) PCT No.: PCT/KR2008/002874
§ 371 (c)(1),
(2), (4) Date: Apr. 19, 2010

(87) PCT Pub. No.: WO2009/066841
PCT Pub. Date: May 28, 2009

(65) Prior Publication Data
US 2010/0208344 A1    Aug. 19, 2010

(30) Foreign Application Priority Data

Nov. 19, 2007  (KR) .......................... 10-2007-0117776
Nov. 19, 2007  (KR) .......................... 10-2007-0117777

(51) Int. Cl.
*G02B 5/02* (2006.01)

(52) U.S. Cl. ........................................................ 359/599
(58) Field of Classification Search .................. 359/599, 359/618–625
See application file for complete search history.

(56) References Cited

U.S. PATENT DOCUMENTS

2009/0317634 A1 *  12/2009  Suh .............................. 428/354

FOREIGN PATENT DOCUMENTS

| JP | 2003-25473 A | 1/2003 |
| JP | 2005-131957 A | 5/2005 |
| KR | 10-2005-0059967 A | 6/2005 |
| KR | 10-2006-0128320 A | 12/2006 |
| TW | 200712659 A | 4/2007 |

* cited by examiner

*Primary Examiner* — James Jones
(74) *Attorney, Agent, or Firm* — Birch, Stewart, Kolasch & Birch, LLP

(57) ABSTRACT

An optical sheet package is disclosed. The optical sheet package includes an optical sheet including an unstructured surface, and a first protective film at a location corresponding to the unstructured surface. The unstructured surface is attached to the first protective film, and a force between the unstructured surface and the first protective film is an electrostatic attraction.

16 Claims, 7 Drawing Sheets

OPTICAL SHEET PACKAGE

TECHNICAL FIELD

An exemplary embodiment relates to a display device, and more particularly, to an optical sheet package.

BACKGROUND ART

Recently, the world's leading companies as well as domestic companies are actively carrying out the research and production for flat display devices. The display industry is a future oriented industry with the high market value enough to designate as one of the world's 10 next-generation growth engine industries.

The flat display devices may typically include plasma display panels, liquid crystal displays, light emitting devices.

The liquid crystal displays are a leading device of the display industry. The companies and the academies have been making the effort for increasing the quality and the cost competitive power on all sort of components used in the liquid crystal displays.

The liquid crystal display may include a backlight unit producing light, a thin film transistor controlling a movement of a liquid crystal, and various optical sheets and panels capable of diffusing, focusing, and reflecting the light produced by the backlight unit.

The optical sheet may be applied to all sort of display devices as well as the liquid crystal displays. The optical sheet may include a reflective sheet, a polarization sheet, a diffusion sheet, a prism sheet, and so forth.

The optical sheet has a thickness of several micrometers to several hundred micrometers and is very weak to foreign substance and a physical pressure. Therefore, before the optical sheet is used as a component of all sort of display devices, protective films may be attached to both surfaces of the optical sheet so as to protect the optical sheet.

DISCLOSURE OF INVENTION

Technical Problem

An adhesion layer may be generally formed between the optical sheet and the protective film so as to attach the optical sheet to the protective film.

The adhesion layer can be generally attached to and separated from an object several times. However, when the adhesion layer is separated from the object, a formation material of the adhesion layer may often remain on the object. Hence, the object may be polluted.

In particular, if the formation material of the adhesion layer remains on the optical sheet when the protective film is separated from the optical sheet, the optical sheet may be polluted. As a result, the poor display devices using the polluted optical sheet may be manufactured.

The adhesion layer used to attach the protective film of a mere packing to the optical sheet may reduce the process efficiency and the manufacturing cost. The adhesion layer may be a large burden in the market.

The optical sheet may have a different shape depending on its functions, but may generally have a structured surface with a predetermined shape and a flat unstructured surface. All of surfaces of the optical sheet may be a structured surface or a flat surface.

Because front and rear surfaces of the optical sheet are different from each other, it is important that the optical sheet is inserted into the display device in consideration of the front and rear surfaces of the optical sheet.

However, because the optical sheet is a very thin component with the thickness of several micrometers to several hundred micrometers, it is difficult to distinguish the front surface and the rear surface of the optical sheet from each other with the naked eye. Therefore, the optical sheet may be inserted into the display device in a state where the front and rear surfaces of the optical sheet are reversed.

Technical Solution

Exemplary embodiments provide an optical sheet package capable of reducing the manufacturing cost and preventing a pollution which may occur in an optical sheet.

Exemplary embodiments also provide an optical sheet package capable of improving the process efficiency by distinguishing front and rear surfaces of an optical sheet from each other.

In one aspect, an optical sheet package comprises an optical sheet including an unstructured surface, and a first protective film at a location corresponding to the unstructured surface, wherein the unstructured surface is attached to the first protective film, and a force between the unstructured surface and the first protective film is an electrostatic attraction.

In another aspect, an optical sheet package comprises an optical sheet including first and second unstructured surfaces, a first protective film at a location corresponding to the first unstructured surface, and a second protective film at a location corresponding to the second unstructured surface, wherein the first unstructured surface is attached to the first protective film, and the second unstructured surface is attached to the second protective film, and a force between the first unstructured surface and the first protective film and a force between the second unstructured surface and the first protective film are an electrostatic attraction.

Advantageous Effects

As described above, in the optical sheet package according to the exemplary embodiments, the manufacturing cost can be reduced and the pollution which may occur in the optical sheet can be prevented.

Furthermore, in the optical sheet package according to the exemplary embodiments, the reverse of the front and rear surfaces of the optical sheet can be prevented, and thus the process efficiency can be improved and the production of defective goods can be prevented.

BRIEF DESCRIPTION OF THE DRAWINGS

The accompany drawings, which are included to provide a further understanding of the invention and are incorporated on and constitute a part of this specification, illustrate embodiments of the invention and together with the description serve to explain the principles of the invention. In the drawings.

BEST MODE FOR CARRYING OUT THE INVENTION

Reference will now be made in detail embodiments of the invention examples of which are illustrated in the accompanying drawings.

FIGS. 1 to 4 show an optical sheet package according to an exemplary embodiment.

As shown in FIGS. 1 to 4, an optical sheet package 1000 according to the exemplary embodiment may include optical sheets 100, 200, and 300, and a first protective film 120.

The optical sheet according to the exemplary embodiment may be a prism sheet 100, a microlens sheet 200, a reflective polarizing sheet 300, a diffusion sheet, or a lenticular lens sheet.

The reflective polarizing sheet 300 may include a core layer in which two layers each having a different refraction index are alternately stacked, a base layer, and a protective layer. The core layer, the base layer, and the protective layer are put together and shown in FIGS. 3 and 4 as a reference numeral 340.

Figure 3:
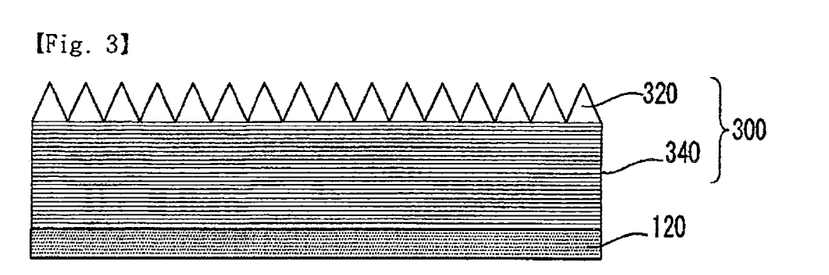
Figure 4:
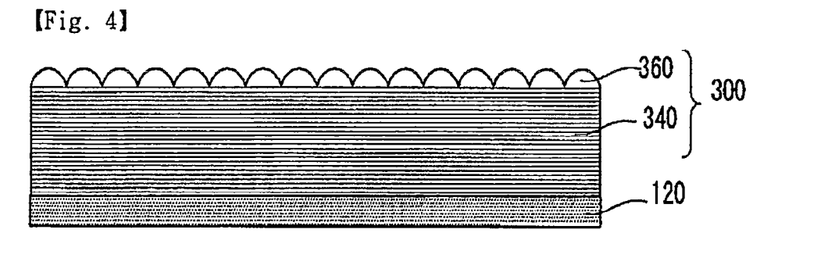

A prism unit 320 or a diffusion unit 360 may be further positioned on the protective layer. The diffusion unit 360 may have any one of a matte shape, a microlens shape, and a lenticular lens shape.

A thickness of the optical sheet lies substantially in a range between 60 μm and 550 μm.

Figure 1:
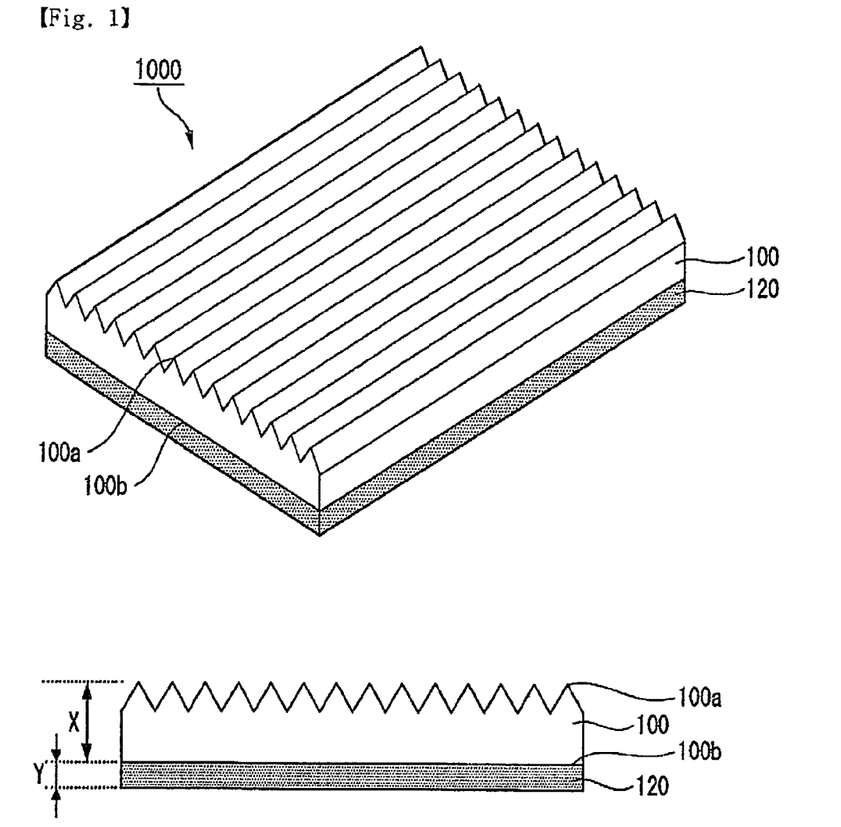
FIGS. 1 to 4 show an optical sheet package according to an exemplary embodiment.
Figure 2:
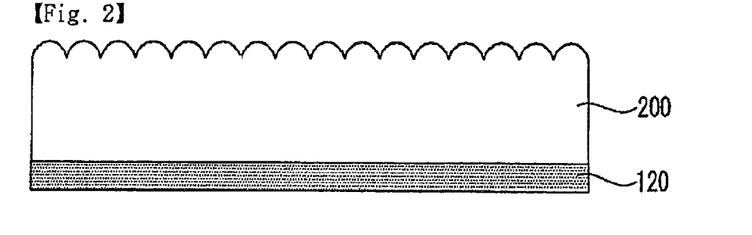

Below, the prism sheet 100 will be described as an example of the optical sheet according to the exemplary embodiment.

The optical sheet 100 may include a structured surface 100a having a predetermined shape, for example, a prism shape of a prism sheet, and a flat unstructured surface 100b.

Because the optical sheet 100 is manufactured for the optical purpose, the optical sheet 100 is weak to foreign substance and pollutant and is easily damaged by a physical pressure and a scratch. Therefore, a protective film 120 may be attached to the optical sheet 100 so as to protect the optical sheet 100.

Figure 5:
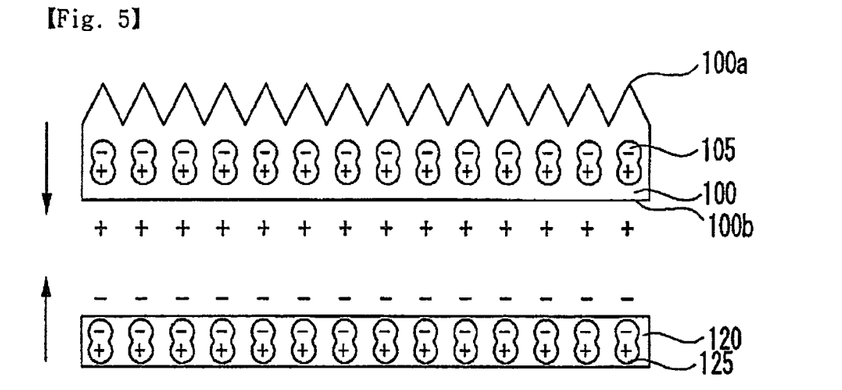
FIGS. 5 to 6 are diagrams for explaining an electrostatic attraction of the optical sheet package according to the exemplary embodiment.
Figure 6:
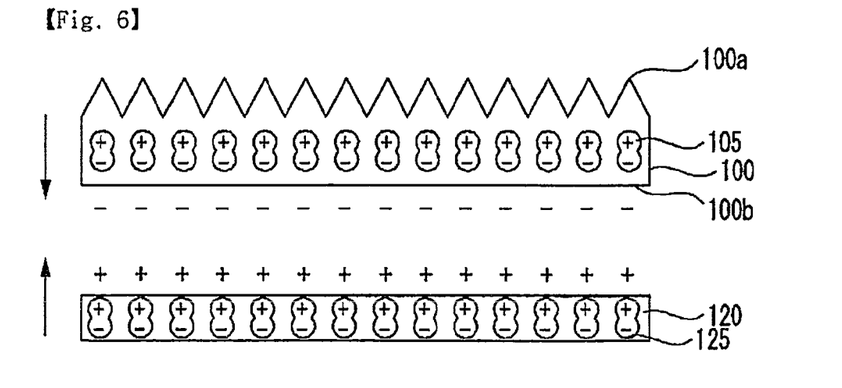

FIGS. 5 to 6 are diagrams for explaining an electrostatic attraction of the optical sheet package 1000.

As shown in FIGS. 5 to 6, the first protective film 120 may be attached to the unstructured surface 100b of the optical sheet 100. The first protective film 120 may be attached to the unstructured surface 100b due to an electrostatic attraction. This means that the electrostatic attraction exists between the first protective film 120 and the unstructured surface 100b.

The electrostatic attraction is an electrical force by attraction between electrons and positive charges which an object has. For example, after the hair is combed with a comb, the comb is brought in close proximity to scraps of paper. So, the scraps of paper are attracted to the comb. There is no free electron in a nonconductor such as a paper. However, if the nonconductor is brought in close proximity to a charged body of a predetermined polarity, an arrangement of molecules having a polarity in the non-conductor changes. An object having the above-described properties is called a dielectric.

Since the amount of positive charges is equal to the amount of negative charges in the dielectric, there is no change in an arrangement of molecules. However, molecules in both ends of the dielectric are arranged in one direction, and thus charges are induced. A reason why dust is attracted to a synthetic fiber is the above-described properties of the dielectric.

As shown in FIG. 5, if a charged body of a negative polarity is brought in close proximity to the unstructured surface 100b, the unstructured surface 100b has a positive polarity for a predetermined period of time. At this time, if the first protective film 120 approaches to the unstructured surface 100b facing the first protective film 120, the first protective film 120 can be attached to the unstructured surface 100b because the amount of charges of a negative polarity on one surface of the first protective film 120 are more than the amount of charges of a positive polarity.

If a charged body of a positive polarity is brought in close proximity to one surface of the first protective film 120, one surface of the first protective film 120 has a negative polarity for a predetermined period of time. At this time, if the first protective film 120 approaches to the unstructured surface 100b, the first protective film 120 can be attached to the unstructured surface 100 through the above-described principal.

Because the optical sheet 100 and the first protective film 120 have properties of a dielectric, the optical sheet 100 and the first protective film 120 do not have a polarity in a state where an electromagnetic force is not applied to the optical sheet 100 and the first protective film 120.

However, if an electromagnetic force is applied to the optical sheet 100 and the first protective film 120, dipole moments 105 and 125 are formed inside the optical sheet 100 and the first protective film 120, and thus the optical sheet 100 and the first protective film 120 partially have a polarity.

FIG. 6 shows an example where the optical sheet 100 is attached to the first protective film 120 when an electromagnetic force having a polarity opposite the polarity shown in FIG. 5 is applied to the optical sheet 100 and the first protective film 120. The principal of the electrostatic attraction of FIGS. 5 and 6 are the same.

As described above, because the optical sheet 100 is attached to the first protective film 120 due to the electrostatic attraction without a separate adhesion layer, the manufacturing cost can be reduced.

If an adhesion layer is used to attach the optical sheet 100 to the first protective film 120, when the first protective film 120 to which the adhesion layer is attached is removed from the optical sheet 100, adhesive foreign substance may frequently remain on the optical sheet 100 and the optical sheet 100 may be sticky with the adhesive foreign substance.

However, the exemplary embodiment does not need to consider the above-described problem because the adhesion layer is not used.

MODE FOR THE INVENTION

Figure 7:
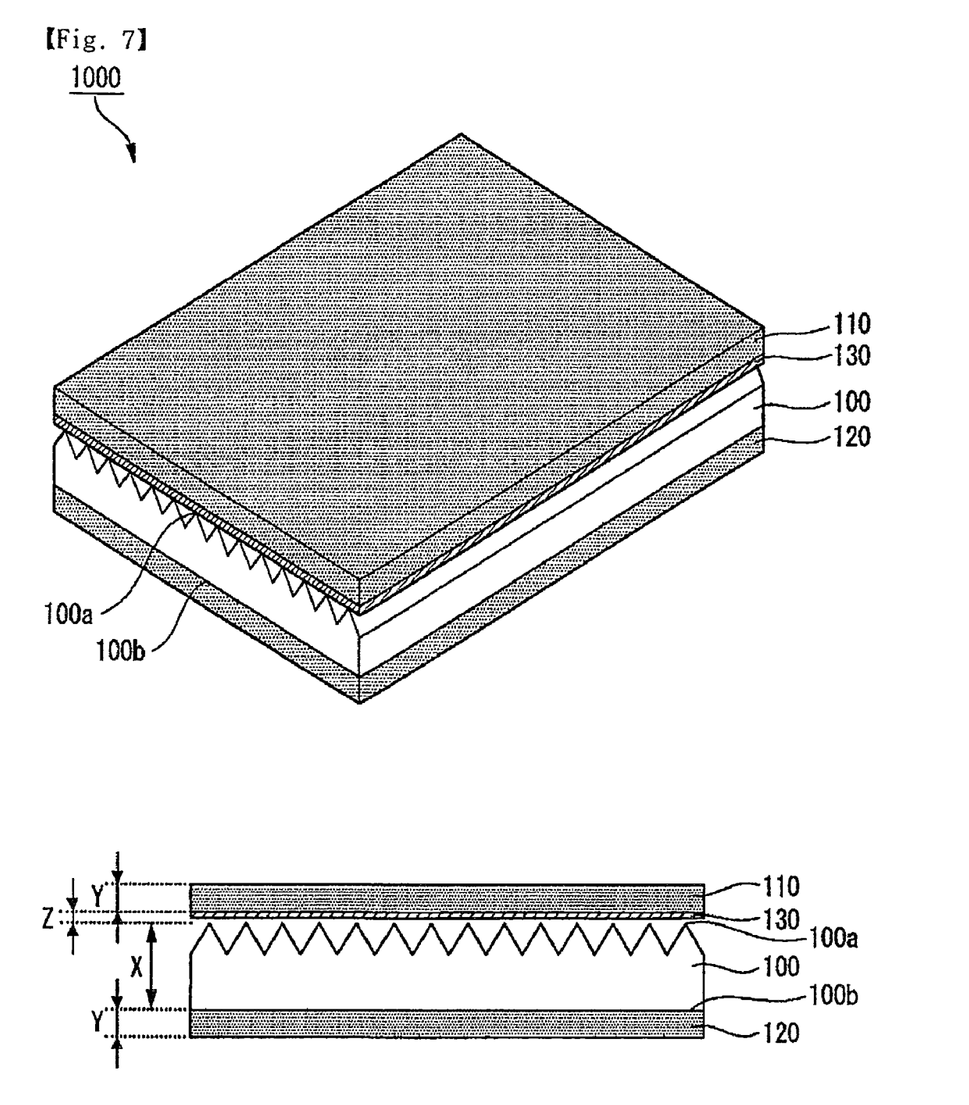
FIG. 7 shows an optical sheet package according to another exemplary embodiment.

FIG. 7 shows an optical sheet package 1000 according to another exemplary embodiment.

An optical sheet 100 shown in FIG. 7 may be a prism sheet, a diffusion sheet, or a reflective polarizing sheet. Below, a prism sheet will be described as an example of the optical sheet 100 according to another exemplary embodiment.

A first protective film 120 may be attached to an unstructured surface 100b of the optical sheet 100 due to an electrostatic attraction.

A second protective film 110 to which an adhesion layer 130 is attached may be attached to a structured surface 100a of the optical sheet 100.

The adhesion layer 130 may be made of an acrylic polymer, an acrylic monomer, an acrylic oligomer, a silicon polymer, polyester, polyurethane, polyamide, polyether, a fluoride polymer, and a rubber polymer, and so forth, but a formation material of the adhesion layer 130 is not limited thereto.

The adhesion layer 130 may widely use a material having transparency, moistness, cohesion, adhesion, climatic property, and heat-resisting property. In particular, an acrylic resin may be advantageous as the formation material of the adhesion layer 130 uniformly having the above-described characteristics.

A thickness Z of the adhesion layer 130 may depend on a thickness and an area of the optical sheet 100, thicknesses and areas of the protective films 110 and 120, and an adhesion property of the adhesion layer 130. The thickness Z of the adhesion layer 130 may lie substantially in a range between 2 μm and 20 μm. The thickness Z of the adhesion layer 130 may equal to or more than 2 μm so as to keep a minimum adhesion force, and the thickness Z may equal to or less than 20 μm so as to prevent an excessive increase in a thickness of the optical sheet package 1000.

A separate film may be formed on the second protective film 110 and then attached to the second protective film 110 to form the adhesion layer 130. Further, the adhesion layer 130 may be directly formed. In case the adhesion layer 130 is directly formed, a general method such as a screen printing method, a spray coating method, or a doctor blade coating method may be used depending on properties of the adhesion layer 130.

The second protective film 110 to which the adhesion layer 130 is attached is positioned at a location corresponding to the structured surface 100a of the optical sheet 100, and may be attached to the structured surface 100a through the adhesion layer 130. Because the adhesion layer 130 is easily separated from the structured surface 100a, the adhesion layer 130 can be easily separated from the optical sheet 100 when the optical sheet 100 is used in a specific product.

The first protective film 120 and the second protective film 110 may be made of polypropylene (PP), polyethylene (PE), and polyolefin (PO), and so firth, but a formation material of the protective films 110 and 120 are not limited thereto.

Thicknesses of the first protective film 120 and the second protective film 110 may be set depending on the size of the optical sheet 100 to be protected by the protective films 110 and 120, the adhesion layer 130, and the electrostatic attraction. The thicknesses of the first protective film 120 and the second protective film 110 may lie substantially in a range between 10 μm and 50 μm.

A ratio of the thickness of the optical sheet 100 to the thickness of the first protective film 120 or the second protective film 110 may lie substantially in a range between 1.2:1 and 11:1. The thickness ratio relationship may be changed depending on an adhesion material.

When the optical sheet 100 and the second protective film 110 satisfy the above thickness ratio relationship, an adhesion force between the optical sheet 100 and the second protective film 110 through the adhesion layer 130 is excellent, and the second protective film 110 can be easily removed from the optical sheet 100 using a physical force. Further, it is difficult to separate the first protective film 120 and the optical sheet 100 attached due to the electrostatic attraction from each other if a physical force is not applied to the first protective film 120 and the optical sheet 100.

Figure 8:
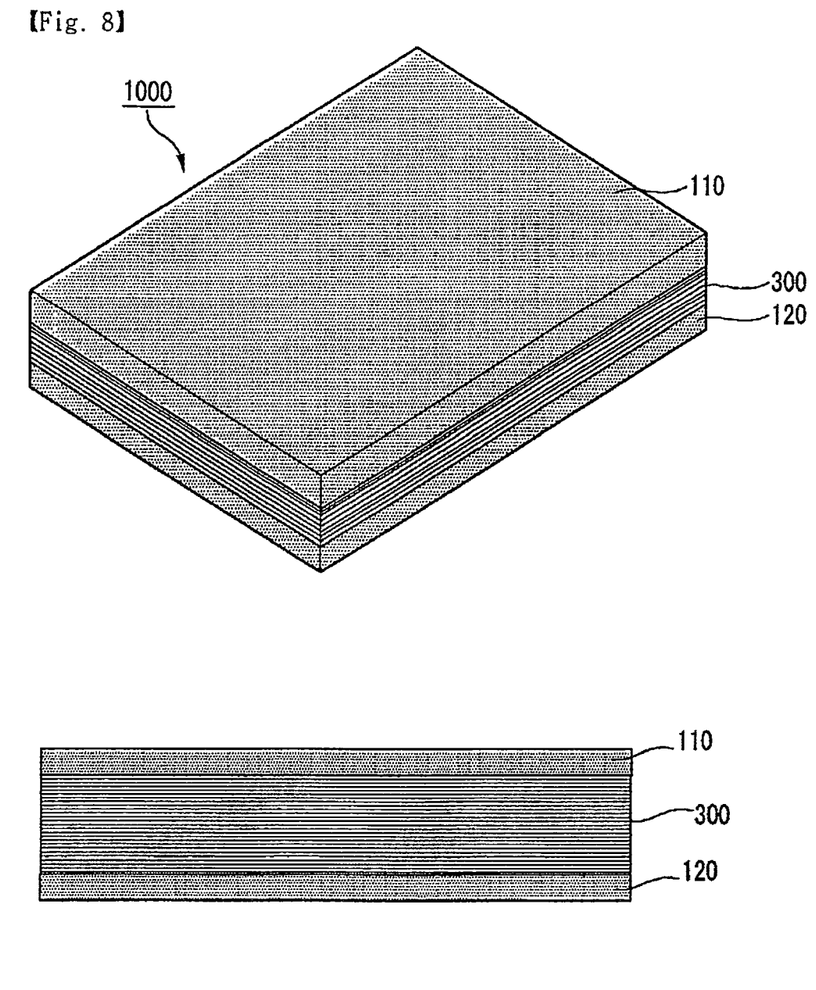
FIG. 8 shows an optical sheet package according to another exemplary embodiment.

FIG. 8 shows an optical sheet package 1000 according to another exemplary embodiment.

As shown in FIG. 8, even if an optical sheet 300 have first and second unstructured surfaces (i.e., both surfaces of the optical sheet 300 are unstructured flat surfaces), a first protective film 120 and a second protective film 110 can be attached to both surface of the optical sheet 300 due to an electrostatic attraction, respectively.

The optical sheet 300 may be any one of a protective sheet, a reflective sheet, or a reflective polarizing sheet.

As described above, because the optical sheet 300 is attached to the first protective film 120 or the second protective film 110 due to the electrostatic attraction without a separate adhesion layer, the manufacturing cost can be reduced.

If an adhesion layer is used to attach the optical sheet 300 to the protective film, when the protective film to which the adhesion layer is attached is removed from the optical sheet 300, adhesive foreign substance may frequently remain on the optical sheet 300 and the optical sheet 300 may be sticky with the adhesive foreign substance. However, the present embodiment does not need to consider the above-described problem because the adhesion layer is not used.

FIGS. 9 to 12 show an optical sheet package 2000 according to another exemplary embodiment.

As shown in FIGS. 9 to 12, the optical sheet package 2000 may include an optical sheet 600, a first protective film 610, and a second protective film 620.

A prism sheet including a base film and a prism unit will be described as an example of the optical sheet 600 in FIGS. 9 to 12, but the present exemplary embodiment is not limited thereto. For example, the optical sheet according to the present exemplary embodiment may be a prism sheet 600, a microlens sheet 700, a reflective polarizing sheet 800, a diffusion sheet, or a lenticular lens sheet.

The reflective polarizing sheet 800 may include a core layer in which two layers each having a different refraction index are alternately stacked, a base layer, and a protective layer. The core layer, the base layer, and the protective layer are put together and shown in FIGS. 11 and 12 as a reference numeral 840.

Figure 11:
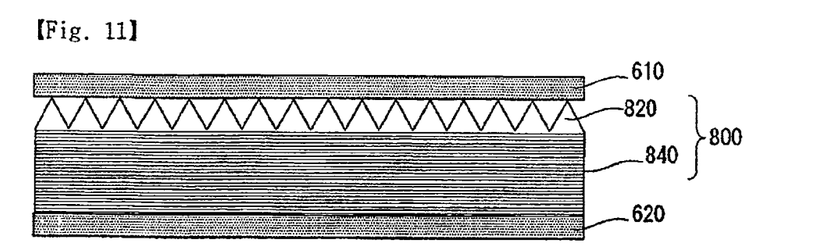
Figure 12:
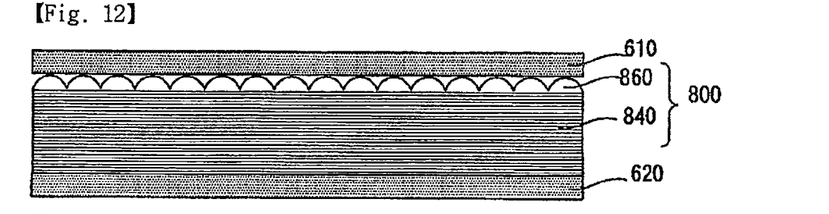

A prism unit 820 or a diffusion unit 860 may be further positioned on the protective layer. The diffusion unit 860 may have any one of a matte shape, a microlens shape, and a lenticular lens shape.

The reflective polarizing sheet 800 generally has a symmetrical structure in which a front surface and a rear surface do not need to be distinguished from each other. However, in case the reflective polarizing sheet 800 further the prism unit 820 or the diffusion unit 860, a front surface and a rear surface of the reflective polarizing sheet 800 need to be distinguished from each other. The reflective polarizing sheet 800 is shown in FIGS. 11 and 12.

Figure 9:
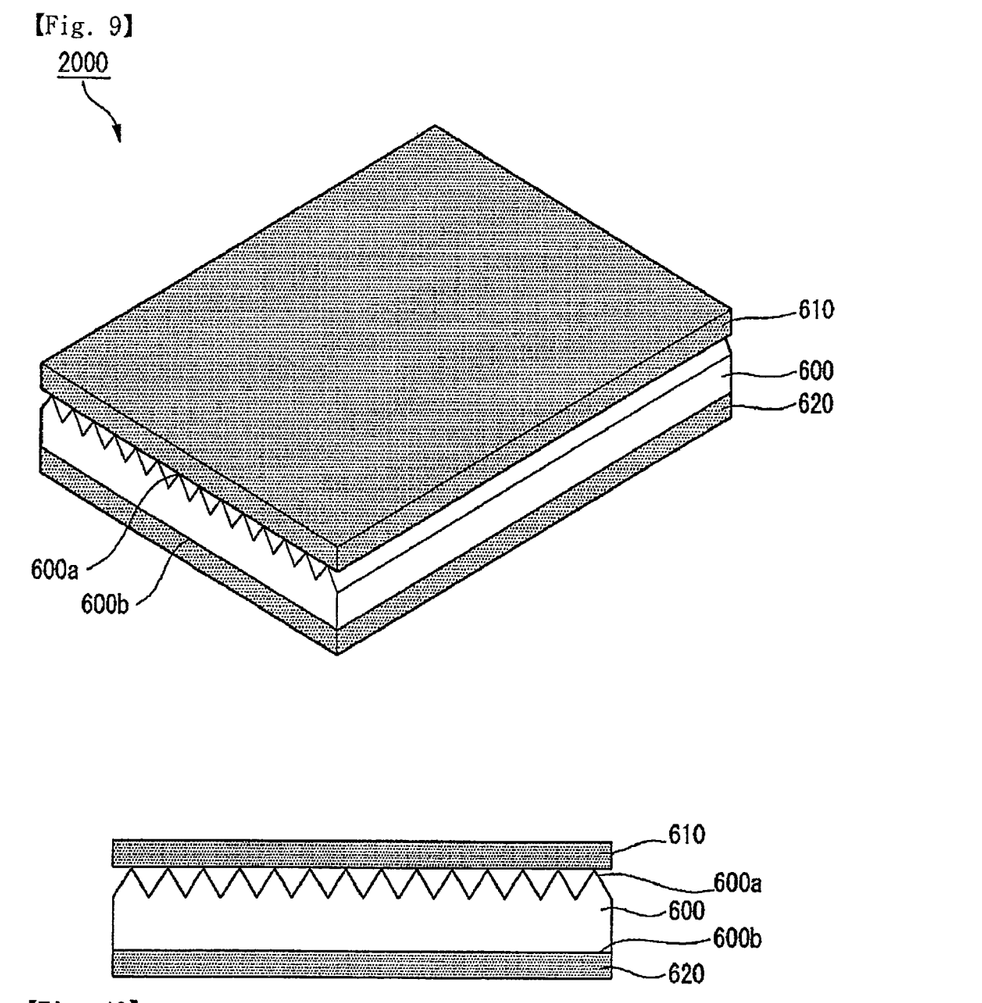
FIGS. 9 to 12 show an optical sheet package according to another exemplary embodiment.
Figure 10:
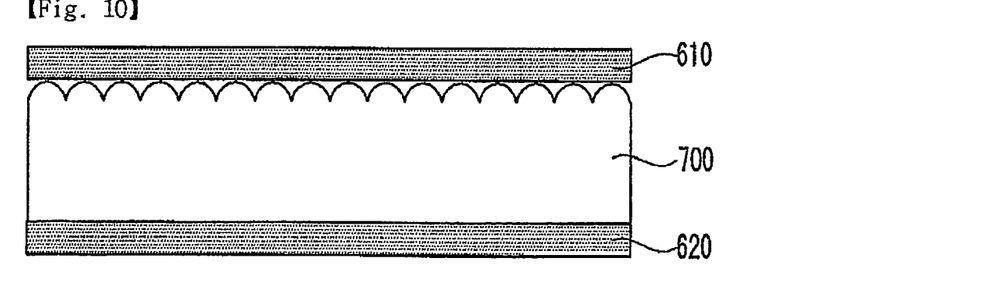

Below, the prism sheet 600 will be described as an example of the optical sheet according to the present exemplary embodiment.

Because the prism sheet 600 may include a prism-shaped structured surface 600a and a flat unstructured surface 600b, both surfaces of the prism sheet 600 may have a different shape and a different function. The case where both surfaces of the optical sheet 600 are distinguished as the structured surface 600a and the flat unstructured surface 600b will be described below.

Even if the optical sheet 600 has both surfaces with the same shape, both surfaces of the optical sheet need to be distinguished from each other depending on each function of both surfaces. The above case may be included in the present invention.

The optical sheet 600 may include the structured surface 600a having a predetermined shape, for example, a prism shape of a prism sheet, and the flat unstructured surface 600b.

Because the optical sheet 600 is manufactured for the optical purpose, the optical sheet 600 is weak to foreign substance and pollutant and is easily damaged by a physical pressure and a scratch. Therefore, protective films 610 and 620 may be attached to both surface of the optical sheet 600 so as to protect the optical sheet 600.

The first protective film 610 and the second protective film 620 may be made of polypropylene (PP), polyethylene (PE), and polyolefin (PO), and so firth, but a formation material of the protective films 610 and 620 are not limited thereto.

An adhesion layer may be formed on the protective films 610 and 620 so as to attach the optical sheet 600 to the protective films 610 and 620. The adhesion layer may be made of an acrylic polymer, an acrylic monomer, an acrylic oligomer, a silicon polymer, polyester, polyurethane, polyamide, polyether, a fluoride polymer, and a rubber polymer, and so forth, but a formation material of the adhesion layer is not limited thereto.

The first protective film 610 may be positioned on the structured surface 600a of the optical sheet 600, and the second protective film 620 may be positioned on the unstructured surface 600b of the optical sheet 600.

The first protective film 610 and the second protective film 620 may have a predetermined color.

The first protective film 610 and the second protective film 620 may each have a different color. For example, if the first protective film 610 has a red-based color, the second protective film 620 may have a blue-based color. Further, if the first protective film 610 has a green-based color, the second protective film 620 may have a yellow-based color.

In other words, colors of the first protective film 610 and the second protective film 620 are not previously determined. The first protective film 610 and the second protective film 620 may have any color as long as the front surface and rear surface of the optical sheet 600, i.e., the structured surface 600a and the flat unstructured surface 600b can be distinguished from each other.

The colors of the first protective film 610 and the second protective film 620 may be complementary colors so as to distinguish the front surface and rear surface of the optical sheet 600 from each other by the colors of the first and second protective films 610 and 620.

Figure 13:
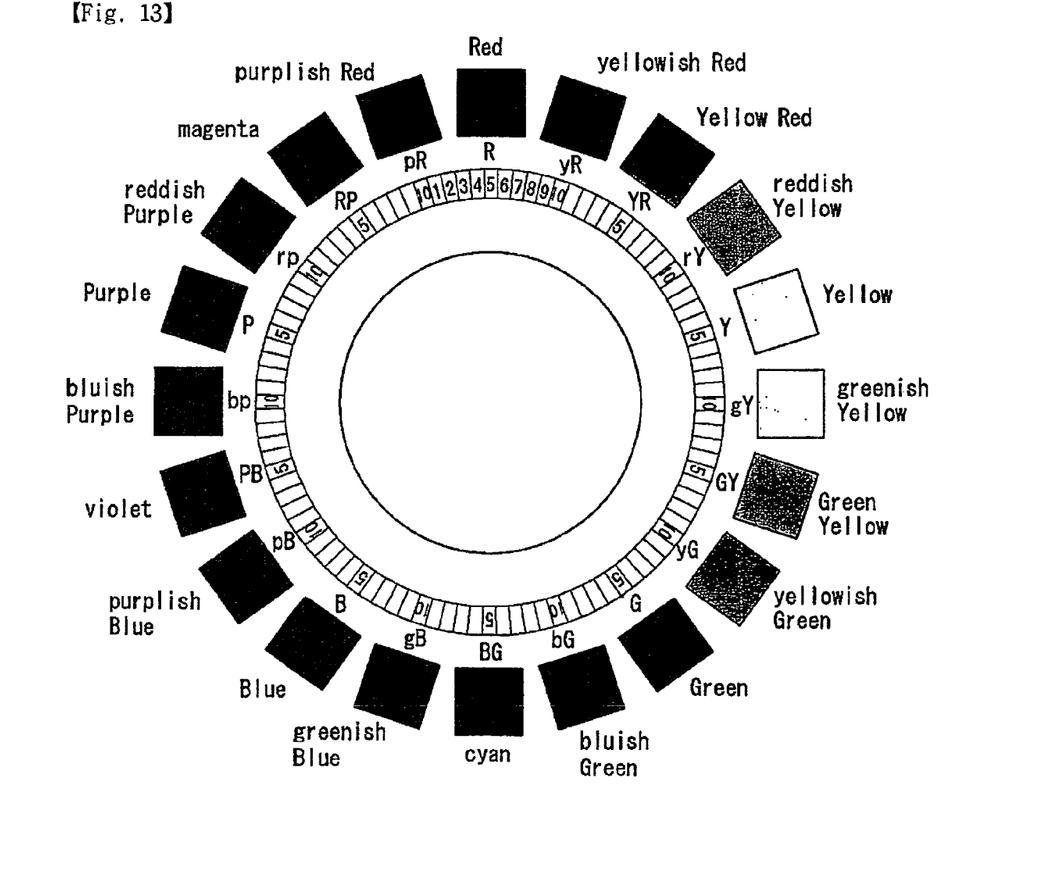
FIG. 13 shows a color wheel.

FIG. 13 shows a color wheel.

Complementary colors can be confirmed from the color wheel of FIG. 13. In other words, the complementary color scheme is made of two colors that are opposite each other on the color wheel. For example, a complementary color of red is cyan, and a complementary color of yellow is violet. Accordingly, if the colors of the first protective film 610 and the second protective film 620 are complementary colors, the front surface and rear surface of the optical sheet 600 can be easily distinguished from each other.

Figure 14:
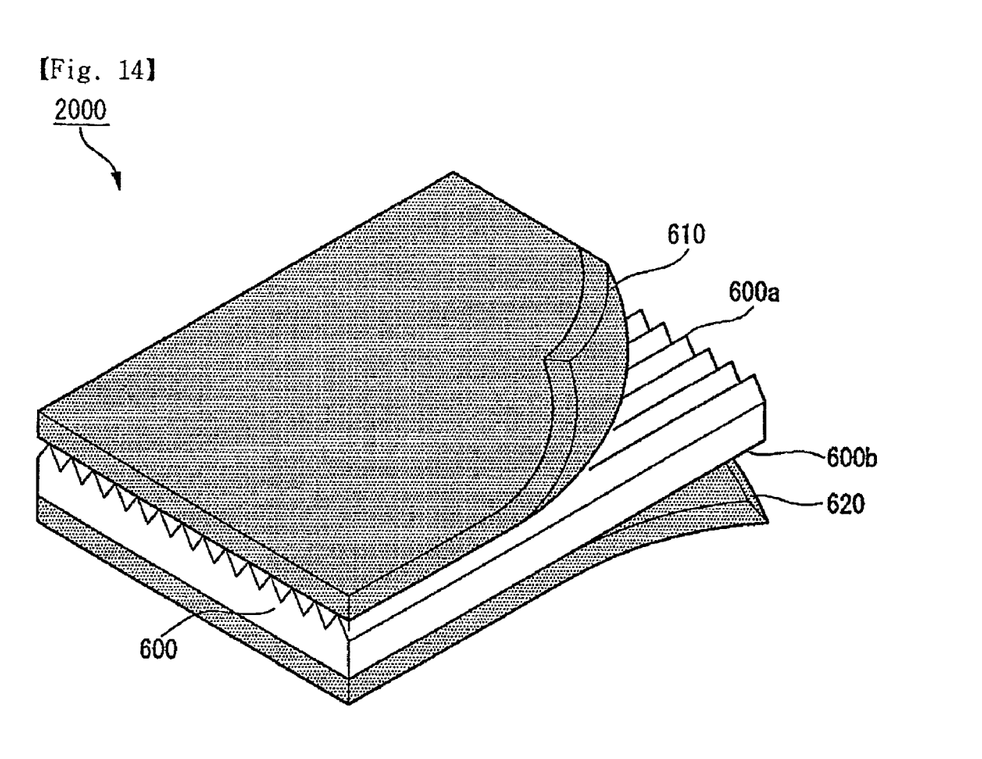
FIG. 14 shows an example to which the optical sheet package shown in FIGS. 9 to 12D is applied.

FIG. 14 shows an example to which the optical sheet package shown in FIGS. 9 to 12 is applied.

As show in FIG. 14, if the first protective film 610 and the second protective film 620 on both surfaces of the optical sheet 600 each have a different color, when the optical sheet 600 is inserted into a display device after the first protective film 610 and the second protective film 620 are removed from the optical sheet package 2000, the optical sheet 600 can be inserted into the display device without a difficulty in distinguishing the front and rear surfaces of the optical sheet 600 from each other.

Accordingly, a process error such as the reverse of the front surface and rear surface of the optical sheet 600 can be prevented. Further, the process efficiency can be improved, and the production of defective goods can be prevented.

The optical sheet package 1000 shown in FIGS. 1 to 8 and the optical sheet package 2000 shown in FIGS. 9 to 14 may be applied together.

One surface or both surfaces of the optical sheet and the protective film are attached to each other by the electrostatic attraction, and at the same time, the protective films on both surfaces of the optical sheet each have a different color.

As described above, in the optical sheet package according to the exemplary embodiments, the manufacturing cost can be reduced and the pollution which may occur in the optical sheet can be prevented.

Furthermore, in the optical sheet package according to the exemplary embodiments, the reverse of the front and rear surfaces of the optical sheet can be prevented, and thus the process efficiency can be improved and the production of defective goods can be prevented.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

The invention claimed is:

1. An optical sheet package comprising:
   an optical sheet including an unstructured surface; and
   a first protective film at a location corresponding to the unstructured surface, wherein the unstructured surface is attached to the first protective film, and a force between the unstructured surface and the first protective film is an electrostatic attraction.

2. The optical sheet package of claim 1, wherein the optical sheet includes a structured surface positioned opposite the unstructured surface.

3. The optical sheet package of claim 2, further comprising a second protective film at a location corresponding to the structured surface,
   wherein the second protective film is attached to the structured surface using an adhesion layer.

4. The optical sheet package of claim 3, wherein the adhesion layer includes any one of an acrylic polymer, an acrylic monomer, an acrylic oligomer, a silicon polymer, polyester, polyurethane, polyamide, polyether, a fluoride polymer, and a rubber polymer.

5. The optical sheet package of claim 3, wherein the first protective film and the second protective film include any one of polypropylene (PP), polyethylene (PE), and polyolefin (PO).

6. The optical sheet package of claim 1, wherein a thickness of the optical sheet lies substantially in a range between 60 μm and 550 μm.

7. The optical sheet package of claim 3, wherein a thickness of the first protective film or the second protective film lies substantially in a range between 10 μm and 50 μm.

8. The optical sheet package of claim 3, wherein a ratio of a thickness of the optical sheet to a thickness of the first protective film or the second protective film lies substantially in a range between 1.2:1 and 11:1.

9. The optical sheet package of claim 1, wherein the optical sheet includes any one of a diffusion sheet, a prism sheet, a microlens sheet, and a lenticular lens sheet.

10. The optical sheet package of claim 1, wherein the optical sheet is a reflective polarizing sheet including a prism unit or a diffusion unit.

11. The optical sheet package of claim 10, wherein the diffusion unit has any one of a matte shape, a microlens shape, and a lenticular lens shape.

12. The optical sheet package of claim 3, wherein a thickness of the adhesion layer lies substantially in a range between 2 μm and 20 μm.

13. The optical sheet package of claim 3, wherein the first protective film and the second protective film have a different color.

14. An optical sheet package comprising:
 an optical sheet including first and second unstructured surfaces;
 a first protective film at a location corresponding to the first unstructured surface; and
 a second protective film at a location corresponding to the second unstructured surface,
 wherein the first unstructured surface is attached to the first protective film, and the second unstructured surface is attached to the second protective film, and a force between the first unstructured surface and the first protective film and a force between the second unstructured surface and the first protective film are an electrostatic attraction.

15. The optical sheet package of claim 14, wherein the optical sheet includes any one of a reflective sheet, a reflective polarizing sheet, and a protective sheet.

16. The optical sheet package of claim 14, wherein the first protective film and the second protective film have a different color.

* * * * *